(12) United States Patent
Penn

(10) Patent No.: US 9,288,966 B2
(45) Date of Patent: Mar. 22, 2016

(54) COLLAPSIBLE PET BOWL

(71) Applicant: Gated Distribution, Inc., Long Beach, CA (US)

(72) Inventor: Daniel J. Penn, Long Beach, CA (US)

(73) Assignee: Gated Distribution, Inc., Long Beach, CA (US)

( * ) Notice: Subject to any disclaimer, the term of this patent is extended or adjusted under 35 U.S.C. 154(b) by 92 days.

(21) Appl. No.: 14/162,362

(22) Filed: Jan. 23, 2014

(65) Prior Publication Data

US 2014/0202391 A1 Jul. 24, 2014

Related U.S. Application Data

(60) Provisional application No. 61/756,104, filed on Jan. 24, 2013.

(51) Int. Cl.
*A01K 1/00* (2006.01)
*A01K 5/01* (2006.01)
*A01K 7/00* (2006.01)

(52) U.S. Cl.
CPC ............... *A01K 5/0114* (2013.01); *A01K 7/00* (2013.01)

(58) Field of Classification Search
CPC ........ A01K 5/0121; A01K 7/005; A01K 7/00
USPC ............................................. 119/61.5, 61.56
See application file for complete search history.

(56) References Cited

U.S. PATENT DOCUMENTS

| | | | |
|---|---|---|---|
| 1,666,704 A * | 4/1928 | Hunter | 383/2 |
| 2,654,527 A * | 10/1953 | Geckler et al. | 383/40 |
| 5,046,860 A * | 9/1991 | Brennan | 383/38 |
| 5,630,544 A * | 5/1997 | Shane | 229/117.06 |
| 6,016,772 A * | 1/2000 | Noyes | 119/863 |
| 6,655,526 B2 * | 12/2003 | Urman et al. | 206/223 |
| 6,719,140 B1 * | 4/2004 | Rinsler | 206/541 |
| 8,016,485 B2 * | 9/2011 | McCann | 383/10 |
| D659,390 S * | 5/2012 | Guertin et al. | D3/233 |
| D673,056 S * | 12/2012 | Gallas | D9/703 |
| 8,613,262 B1 * | 12/2013 | Mergard | 119/858 |
| 8,746,495 B2 * | 6/2014 | Turvey et al. | 220/677 |
| 9,010,565 B2 * | 4/2015 | Warner | 220/592.03 |
| 2006/0027178 A1 | 2/2006 | Stephens | |
| 2007/0223843 A1 * | 9/2007 | Frohwein | 383/38 |

* cited by examiner

*Primary Examiner* — Kristen C Hayes
(74) *Attorney, Agent, or Firm* — Brinks Gilson & Lione

(57) ABSTRACT

A flexible pet bowl is provided. The flexible pet bowl may include a main trough and one or more side pockets that may be used to store one or more items, such as bags, food, or the like.

20 Claims, 26 Drawing Sheets

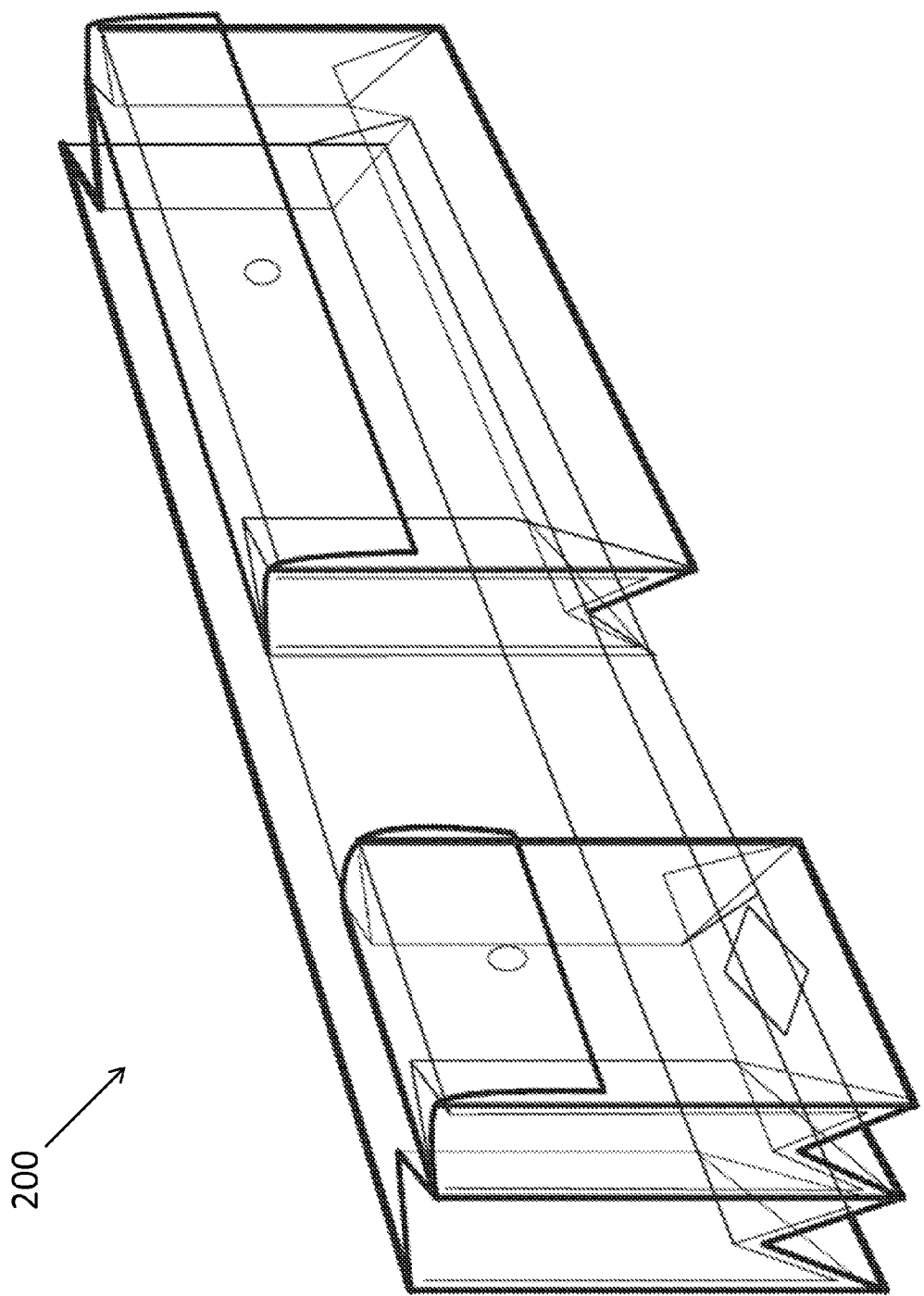

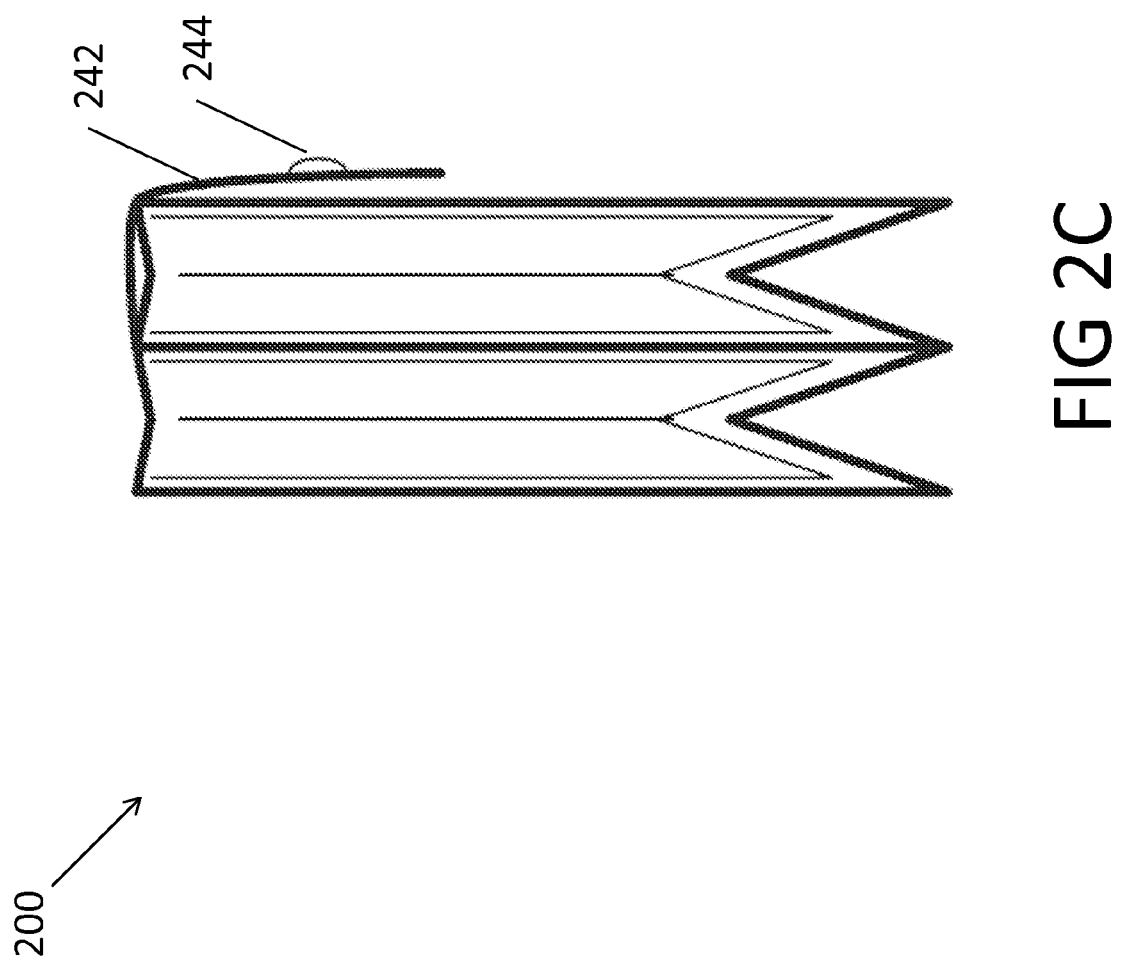

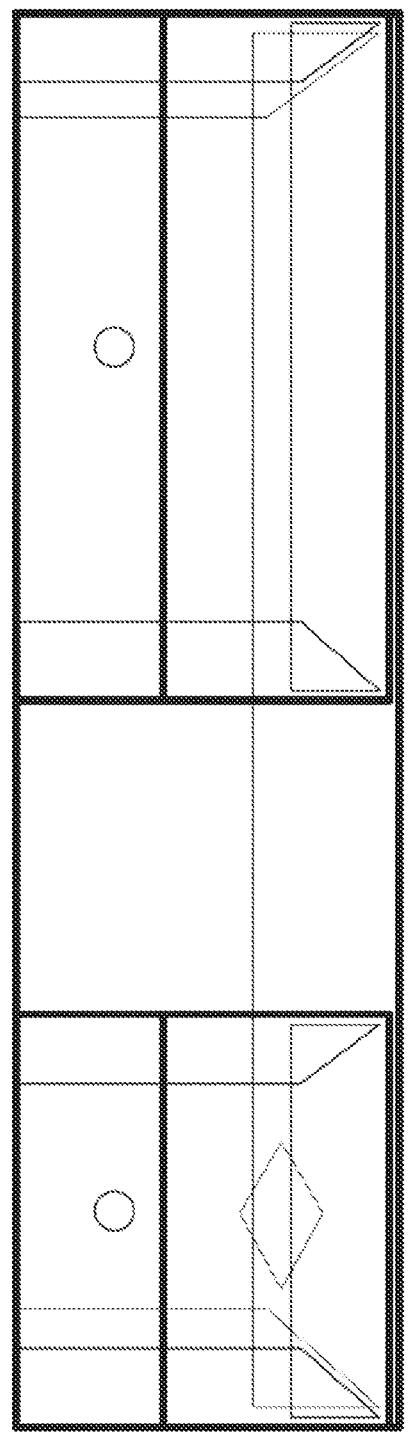

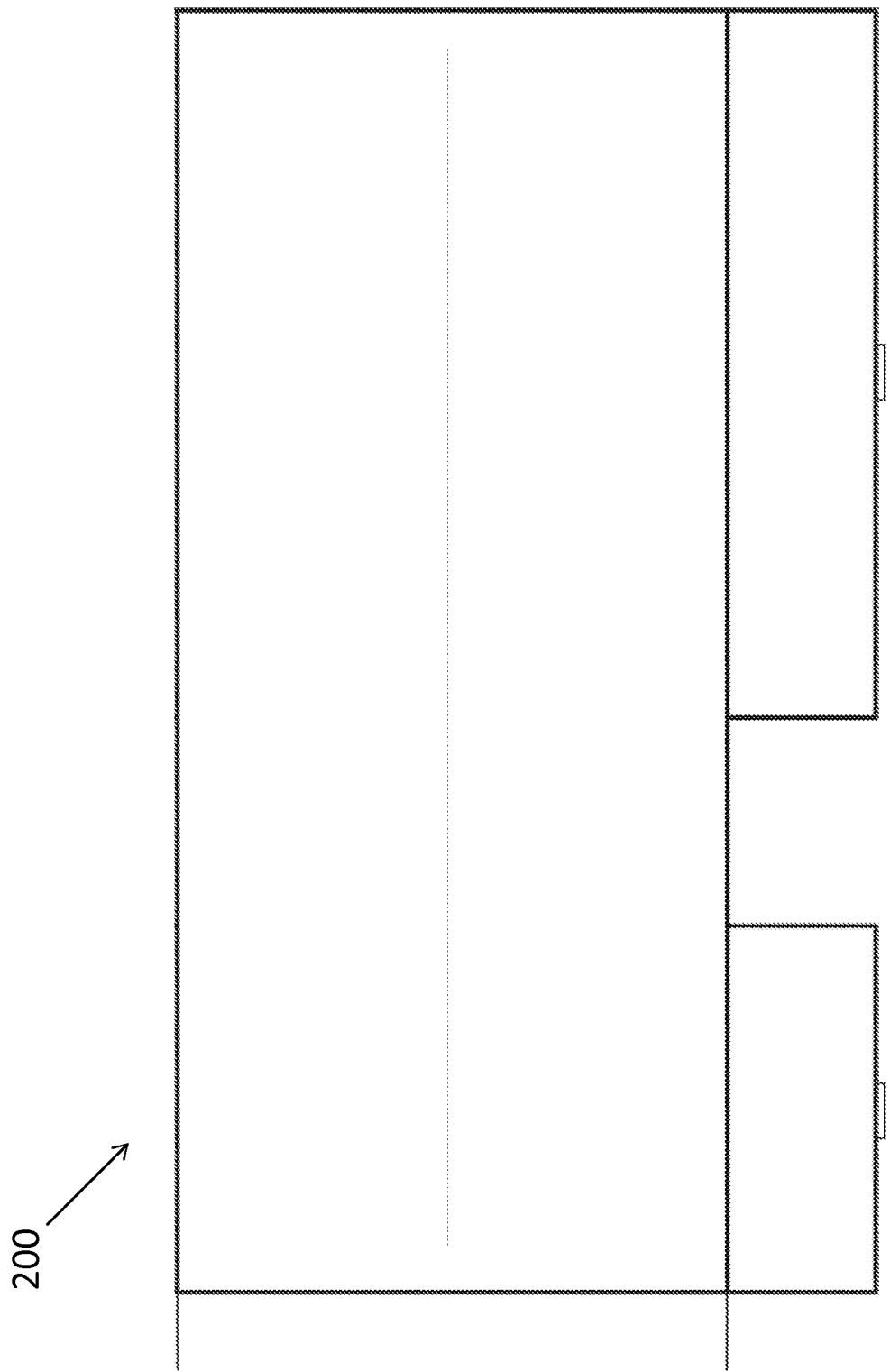

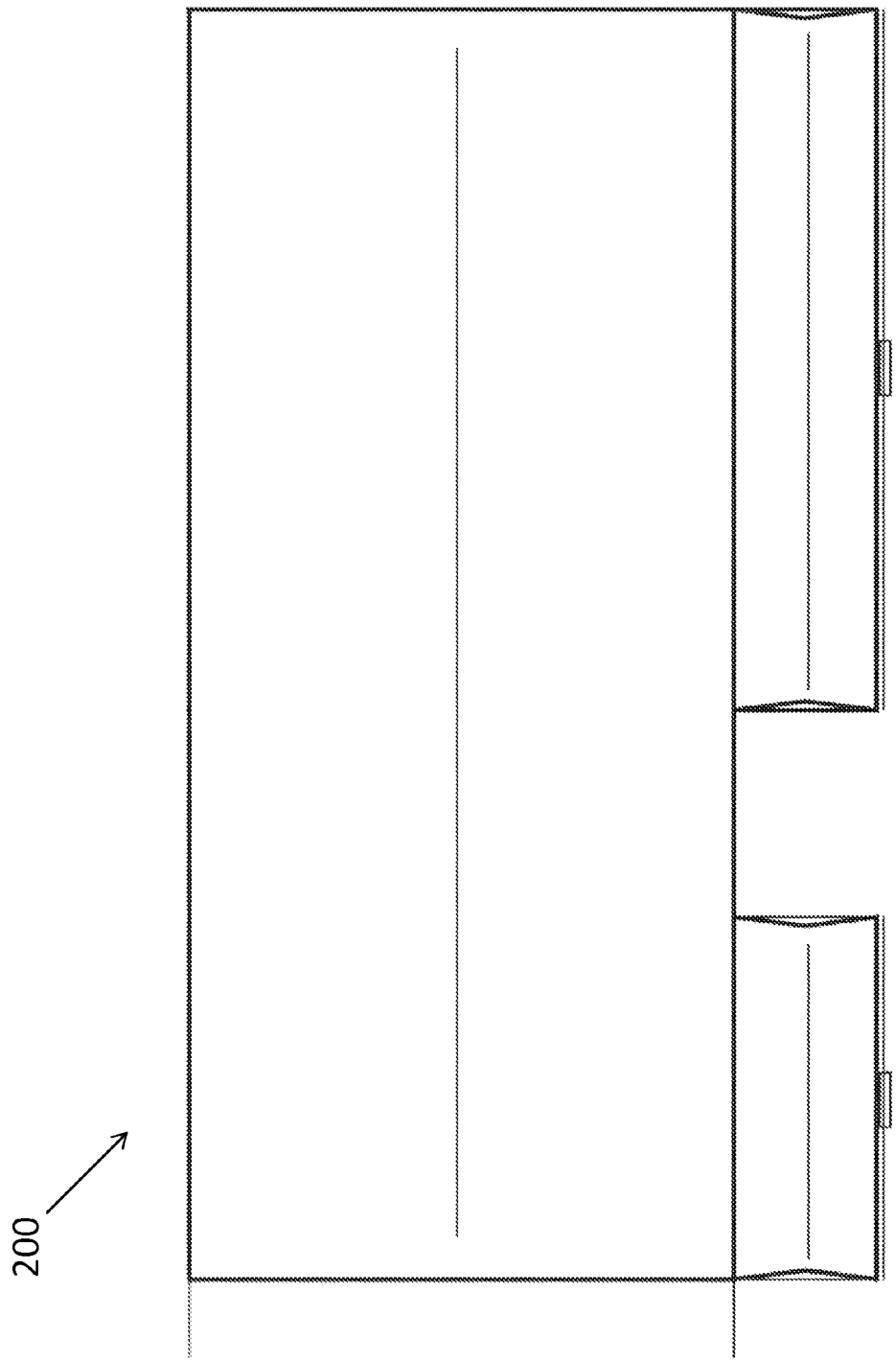

200

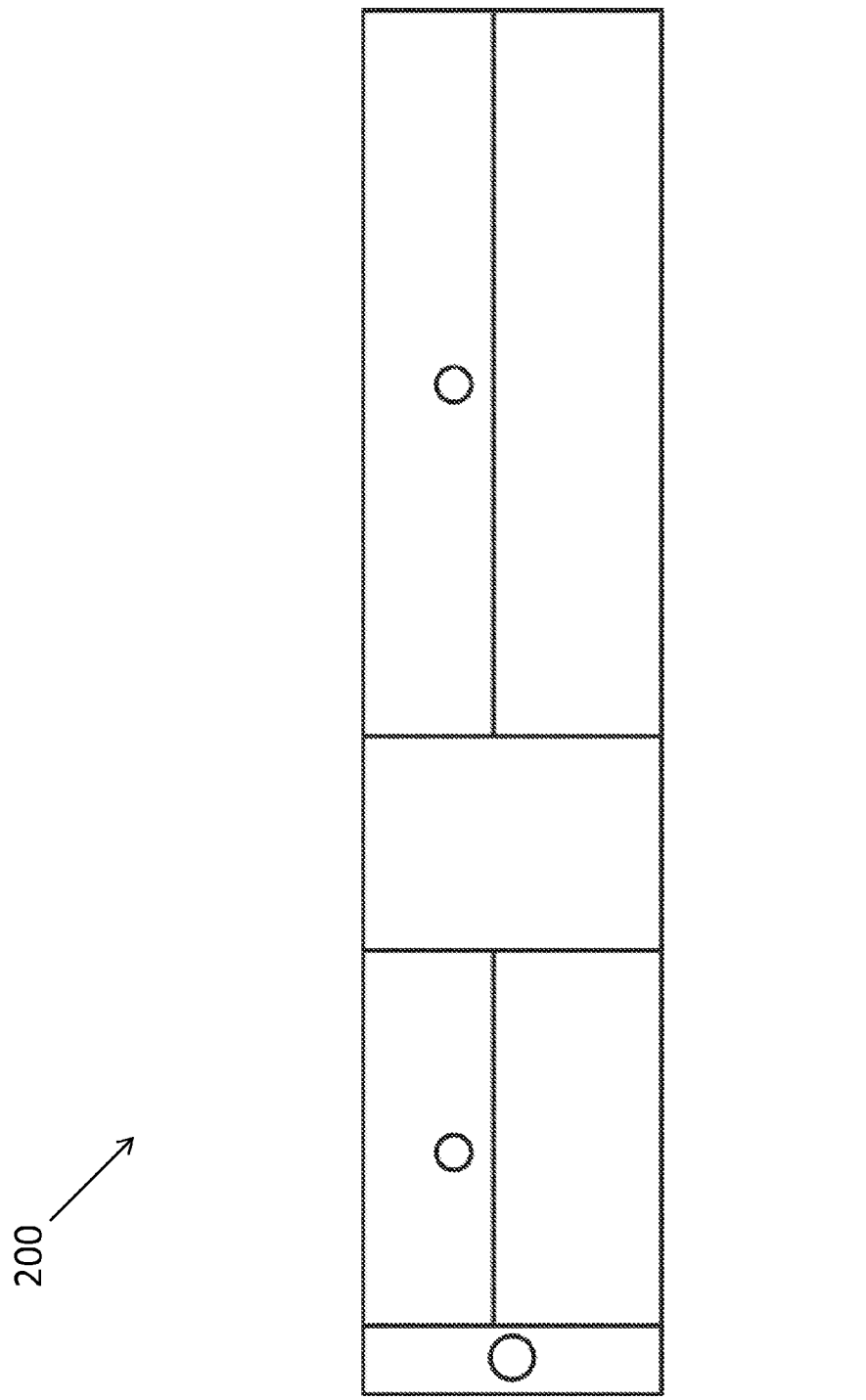

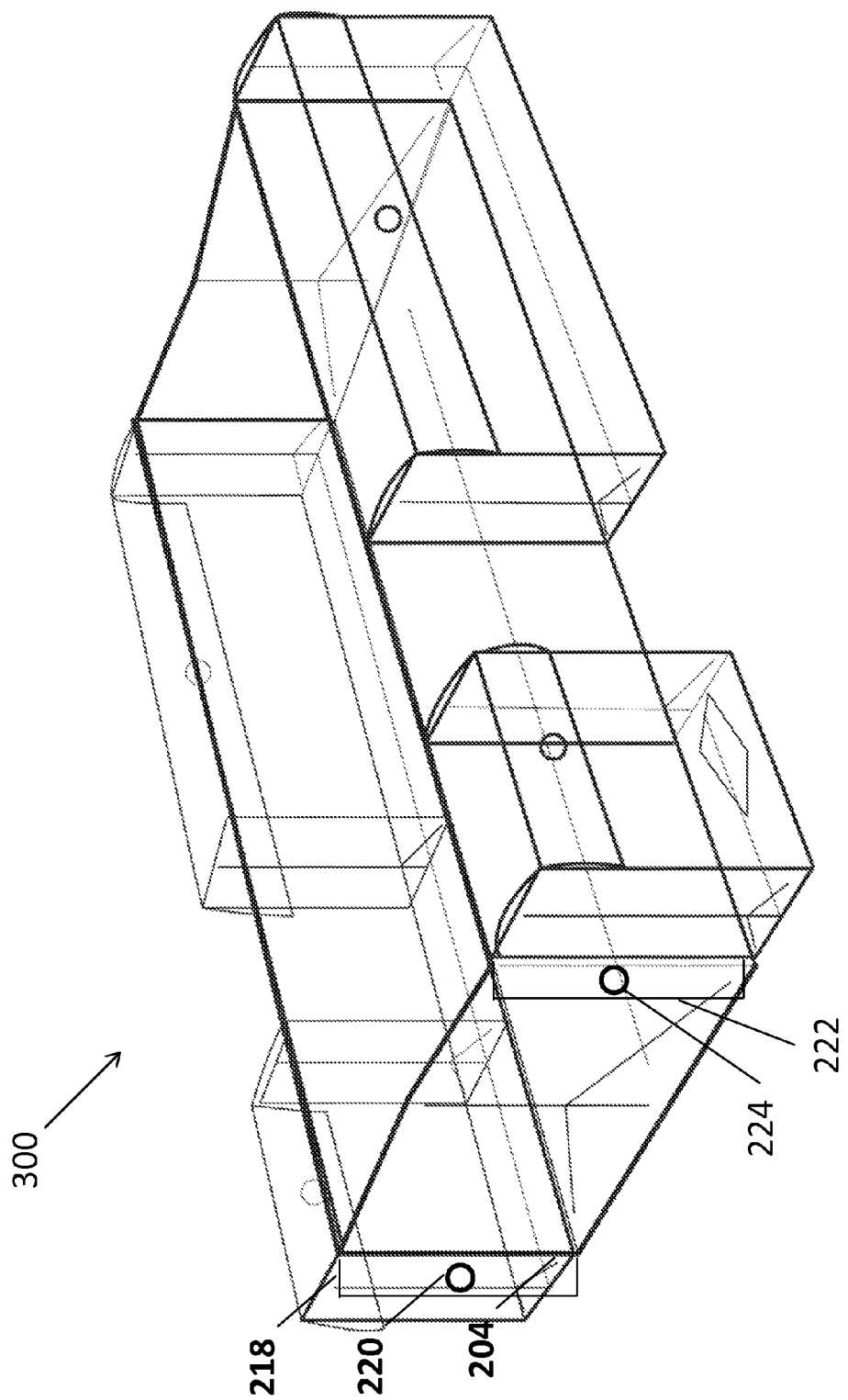

300

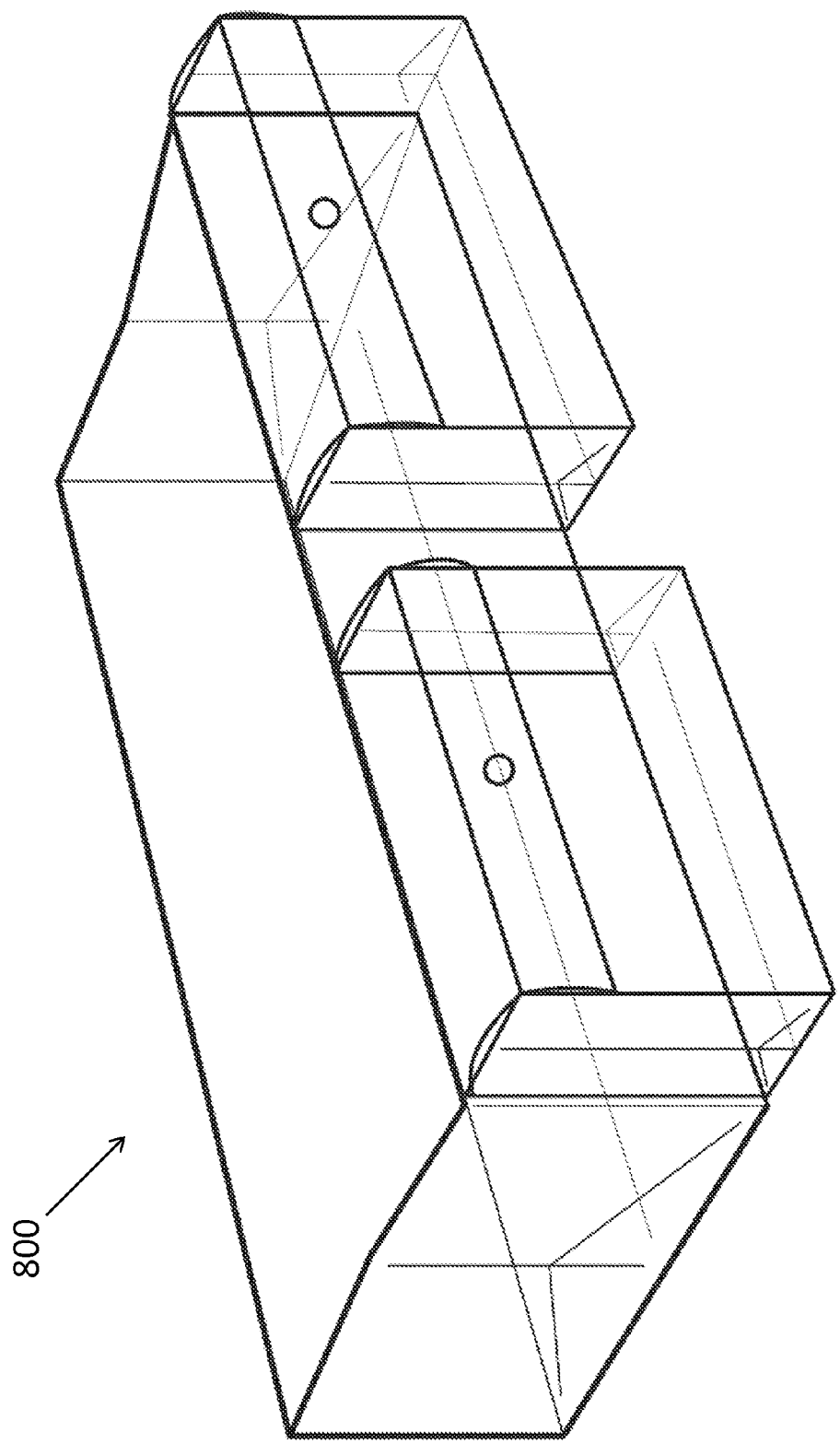

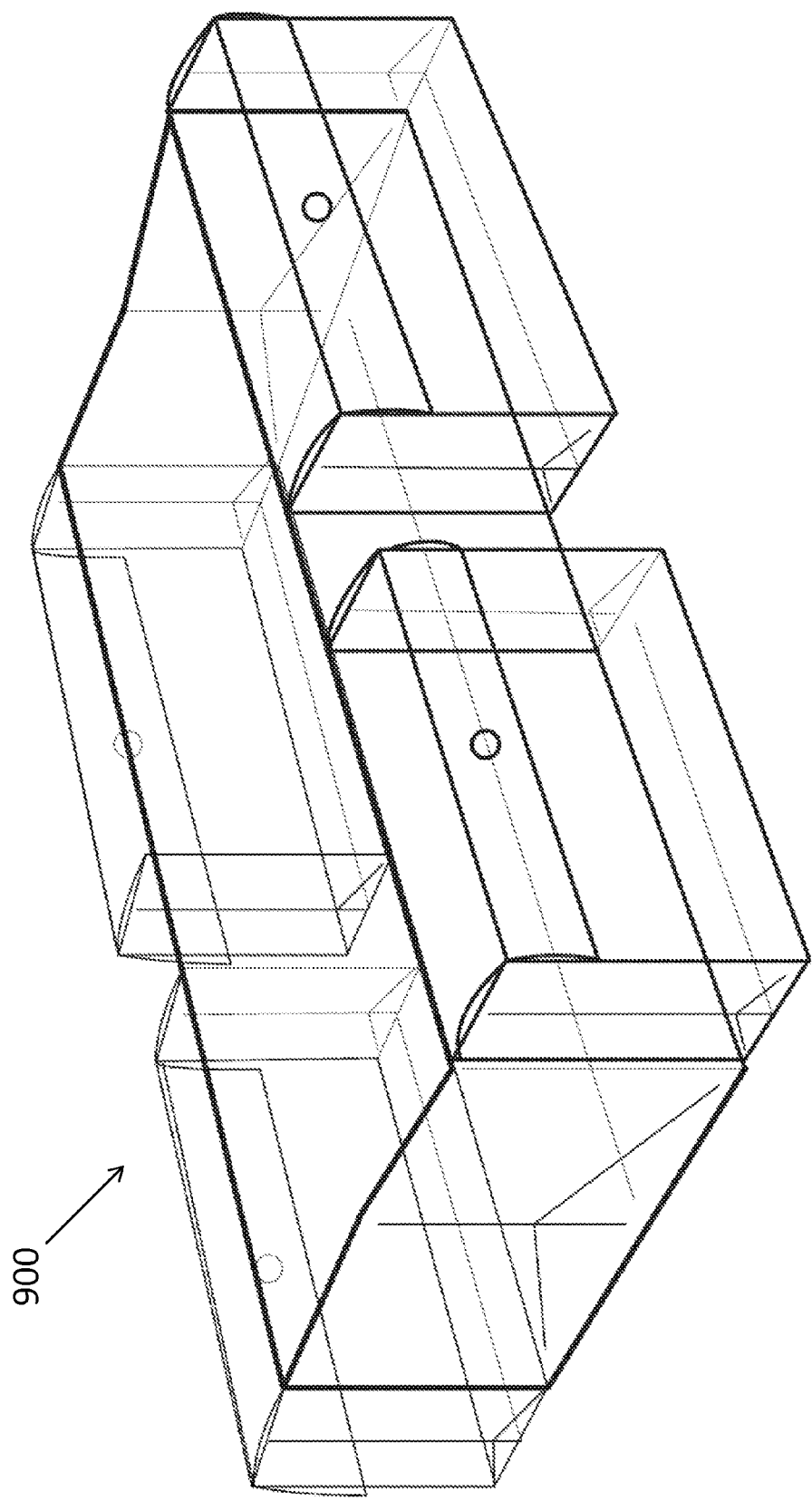

1000

COLLAPSIBLE PET BOWL

REFERENCE TO RELATED APPLICATION

This application claims the benefit of U.S. Provisional Application No. 61/756,104, filed on Jan. 24, 2013, the entirety of which is incorporated by reference herein.

TECHNICAL FIELD

This application relates generally to pet bowls, and more specifically, relates to collapsible pet bowls.

BACKGROUND

A pet bowl is an open container that often is used to hold water or food for a pet. The pet bowl can be made of a number of hard materials, such as ceramics, and can be heavy. The pet bowl may also be made of a pliant sheet material, such as disclosed in US patent Application Publication No. 2006/0027178, which is incorporated by reference herein.

SUMMARY

In one aspect, a pet bowl is disclosed. The pet bowl includes a collapsible multi-sided trough (such as a 4-sided trough) and one or more side pockets along one or more sides of the trough. One, some or all of the side pockets of the pet bowl may be collapsible. Further, the side pockets may be along a single side of the trough, along multiple sides of the trough (such as along opposing sides of the trough or along adjacent sides of the trough), or along all of the sides of the trough. Further, the pet bowl may have a single side pocket, or may have multiple side pockets. For example, the pet bowl may have a single side pocket along a single side of the trough. The single side pocket may span an entire length of the single side of the trough. Alternatively, the single side pocket may span less than the entire length of the single side of the trough. As another example, the pet bowl may have multiple side pockets. The multiple side pockets may be along a single side (such as two side pockets along a single side, with the two side pockets being the same or different sizes) or may have one side pocket along different sides of the trough (such as one side pocket each spanning part or the entire length of different sides of the trough). The side pocket(s) may be closed using a button, a zipper, or the like. In addition, the pet bowl may include a flap alongside one or more edges of the trough. The flap may be formed by heat sealing two sides of the trough. The flap may include a grommet or a reinforced eyelet through which a fastener may be passed.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

FIG. 2B-D illustrates the front perspective view, the side view and the front view of the pet bowl illustrated in FIG. 2A in a collapsed state.

FIG. 2E illustrates a top view of FIG. 2A.

FIG. 2F illustrates a bottom view of FIG. 2A.

FIG. 2H illustrates a front view of FIG. 2A.

FIG. 3A illustrates a front perspective view of a trough and side pockets on multiple sides for a pet bowl in an expanded state.

FIG. 8 illustrates a front perspective view of a trough and multiple side pockets on a single side for a pet bowl in an expanded state.

FIG. 9 illustrates a front perspective view of a trough and multiple side pockets on multiple sides for a pet bowl in an expanded state.

DETAILED DESCRIPTION

Figure 1:
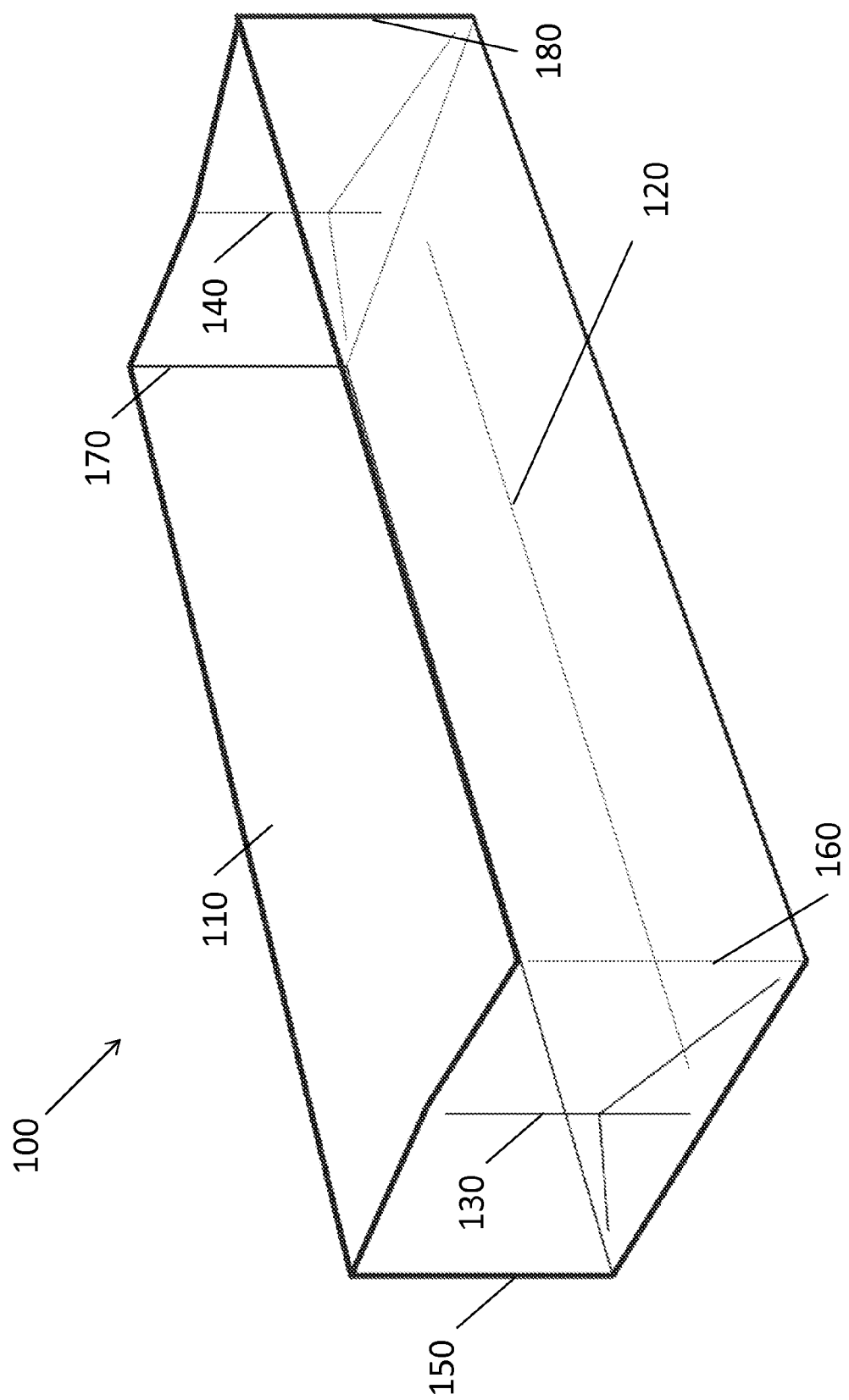
FIG. 1 illustrates a front perspective view of a trough for a pet bowl.
Figure 2A:
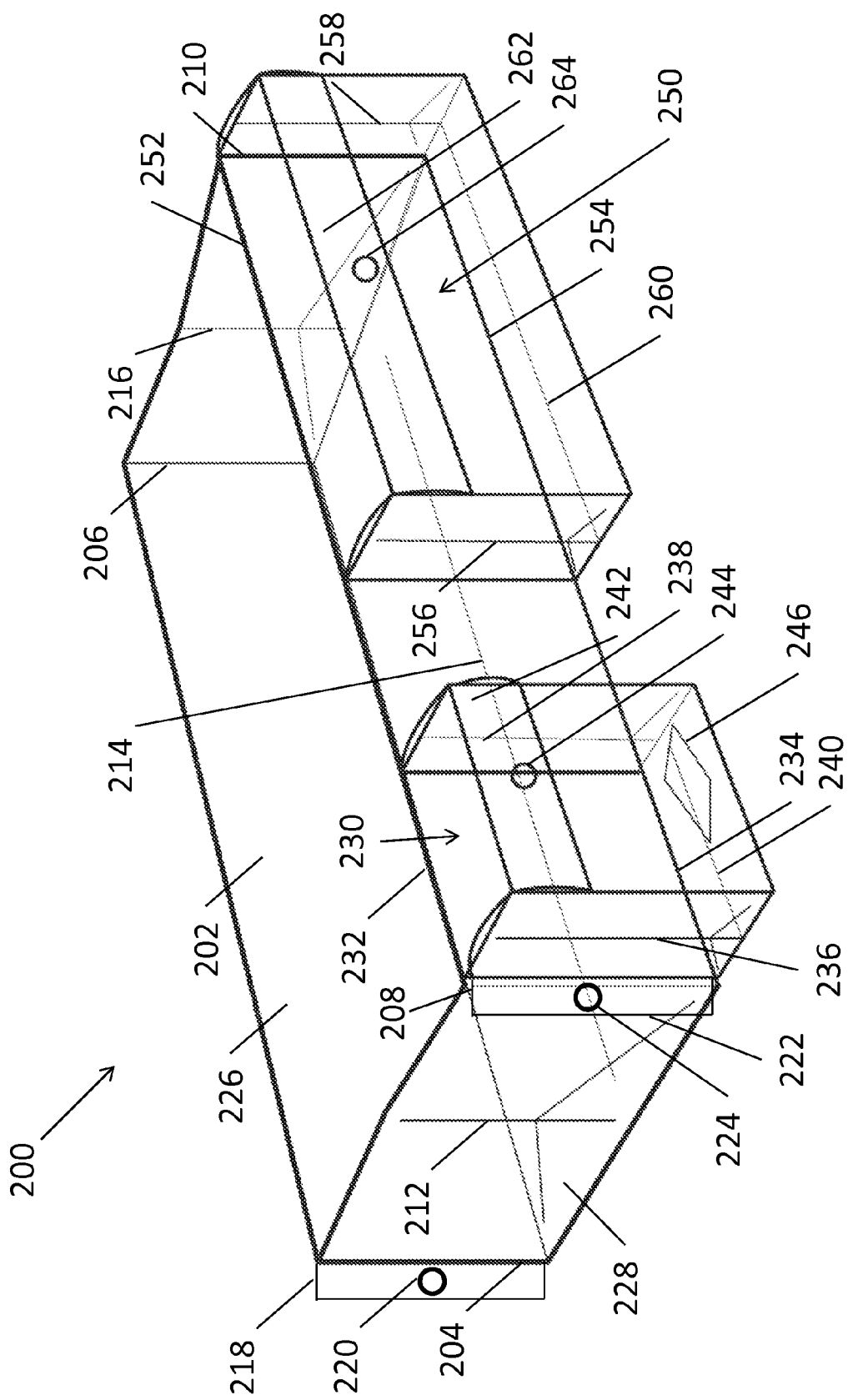
FIG. 2A illustrates a front perspective view of a trough and two side pockets for a pet bowl in an expanded state.
Figure 2G:
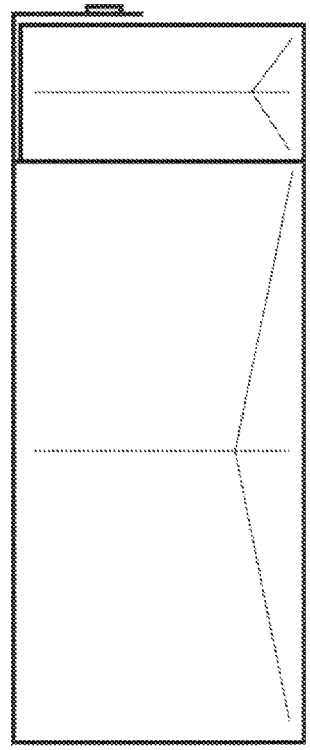
FIG. 2G illustrates a side view of FIG. 2A.

FIG. 1 illustrates a front perspective view of a pet bowl 100 in its expanded state. The pet bowl 100 is generally rectangular in shape with two long sides and two short sides. Alternatively, the pet bowl 100 may be square in shape with four sides of equal length. Corners 150, 160, 170, 180 may be created by heat sealing the four sides, as illustrated in FIG. 1. Alternatively, corners may further be created to form flaps as illustrated in FIG. 2A, discussed below.

The pet bowl 100 includes a trough 110 in which dry goods (such as food) or liquids (such as water) may be inserted. The material of the pet bowl may be composed of a waterproof material, such as plastic. More specifically, the pet bowl 100 may be composed of any one, some or all of the following ingredients including: PE (Polyethylene) PE/Lower Linear Density PolyEthylene—LLDPE; Polyethylene Terephthalate—PET; and Oriented Polypropylene/OPP. The material may be transparent, semi-transparent, or opaque. For example, some of the materials, such as the sides and the pockets (discussed below) may be opaque or semi-transparent, and the bottom may be transparent.

The trough 110 has a generally rectangular shape. Alternatively, the trough 110 may have a square shape with a bottom.

The pet bowl 100 includes four or more corners 150, 160, 170, 180. In addition, in one embodiment, the different corners may form angles that are greater than 45 degrees (and more specifically, equal to 90 degrees). In this way, trough 110 may have greater stability. As discussed in more detail below, the trough may comprise different shapes, such as disclosed in FIGS. 10A-E and 11.

The trough 110, which is formed with multiple sides and a bottom, may be configured to receive liquid and/or food. In this regard, the multiple sides and the bottom may be sealed in order to be leak-proof or reduce leaks.

The pet bowl 100 may include one or more seams. As shown in FIG. 1, one seam 120 is along a centerline of the trough 110. In one embodiment, the seam 120 may be along the longer portion of the trough 110, as shown in FIG. 1. Alternatively, the seam 120 may be along the shorter portion of the trough 110. Further, creases 130, 140 may be included along two or more sides of the pet bowl 100. Seam 120 and creases 130, 140 enable the pet bowl 100 to be collapsed so that the pet bowl 100 generally lies flat.

As discussed in more detail below, the pet bowl may include one or more side pockets. One or more side pockets may be placed on one side of the pet bowl, such as illustrated in FIGS. 2A, 4, 6, 8, and 10A. Alternatively, the side pockets may be placed on multiple sides of the pet bowl. For example, the side pockets may be placed on opposing sides of the pet bowl, such as illustrated in FIGS. 3A, 5, 7, 9 and 11. As another example, the side pockets may be placed on adjacent sides of the pet bowl.

In the instance of multiple side pockets, the side pockets may be of the same general size, such as illustrated in FIGS. 4-11, discussed in more detail below. Alternatively, the side pockets may be of different sizes, such as illustrated in FIGS. 2A and 3A. Further, the side pockets may be configured to house a variety of contents, such as bags (e.g., to clean-up dog waste), food, or the like.

FIG. 2A illustrates a front perspective view of a pet bowl 200 in an expanded state. Pet bowl 200 includes trough 202 and multiple side pockets 230, 250. Trough 202 includes edges 204, 206, 208, 210. Further, trough 202 includes seam 214 and creases 212, 216. Similar to trough 110, trough 202 is formed with multiple sides and a bottom and may be configured to receive liquid and/or food. In this regard, the multiple sides and the bottom may be seal in order to be leak-proof or reduce leaks in trough 202.

Similar to FIG. 1, seam 214 and creases 212, 216 enable the trough 202 to collapse, such as illustrated in FIG. 2B. In one embodiment, the pet bowl 200 may further include one or more flaps. FIG. 2A illustrates two flaps 218, 222. In an alternate embodiment, the pet bowl 200 does not include any flaps. Flaps may be included along a single edge of trough 202, more than one edge but less than all edges of trough 202, or all edges of trough 202 (such as at each of edges 204, 206, 208, 210). The flap may be formed by heat sealing two sides of trough 202. For example, side 226 and side 228 of trough 202 may be heat sealed in order to form flap 218.

The flap may include a hole, such as hole 220 and hole 224. The hole 220, 224 may comprise a grommet or a reinforced eyelet through which a fastener may be passed. In this way, the pet bowl 200 may be configured in a collapsed state and connected via one or both of hole 220, 224 to another device (such as to a dog leash).

FIG. 2A further include side pockets 230, 250. Each of the side pockets 230, 250 may be bonded to trough 202. In one embodiment, less than all of the edges of side pockets 230, 250 that contact trough are bound to trough 202. For example, side pocket 230 may be bound to trough 202 along three sides, such as edge 208, upper line 232 and lower line 234. As another example, side pocket 250 may be bound to trough 202 along three sides, such as edge 210, upper line 252 and lower line 254. As still another example, the side pocket may be bound to trough 202 using less than three sides. In an alternate embodiment, all of the edges of side pockets 230, 250 that contact trough are bound to trough 202.

Side pocket 230 includes center line 240 and creases 236, 238 in order for side pocket 230 to collapse, such as illustrated in FIG. 2B. In one embodiment, the pet bowl 200 may further include one or more upper flaps to close side pockets 230, 250. FIG. 2A illustrates upper flap 242, 262. In an alternate embodiment, the pet bowl 200 does not include any upper flaps so that side pockets 230, 250, when extended are open.

More specifically, side pocket 230 includes an opening, which may be covered by upper flap 242. Upper flap 242 includes a button 244 for closing of the upper flap 242 to the main body of side pocket 230. Alternatively, the opening of side pocket 230 may be closed using a zipper.

Side pocket 230 may further include slit 246 in a side of side pocket 230. Slit 246 is illustrated on the front face of side pocket 230. Alternatively, slit 246 may be positioned along a different face of side pocket 230, such as the face that includes crease 236 or the face that includes crease 238. Slit 246 may be used to access contents within side pocket 230, without opening upper flap 242. For example, side pocket 230 may include bags, such as baggies for use in cleaning dog waste. Slit 246 may be shaped such that the baggies may be pulled from within side pocket 230.

As discussed above, the side pockets on the pet bowl may be the same size or may be different sizes. As shown in FIG. 2A, side pocket 230 is a different size than side pocket 250. Side pocket 250 includes center line 260 and creases 256, 258 in order for side pocket 250 to collapse, such as illustrated in FIG. 2B. Side pocket 250 includes an opening, which may be covered by upper flap 262. Upper flap 262 includes a button 264 for closing of upper flap 262 to the main body of side pocket 250. Alternatively, the opening of side pocket 250 may be closed using a zipper.

FIGS. 2B-D illustrate a front perspective, a side view, and a front view, respectively, of pet bowl 200 in a collapsed state. As shown in FIGS. 2B-D, the trough 202 and side pockets 230, 250 are in the collapsed state. Trough 202 and side pockets 230, 250 may each be configured independently so that one or both of side pockets 230, 250 may be configured in the collapsed state, and trough 202 may be configured in the expanded state. As another example, one or both of side pockets 230, 250 may be configured in the expanded state, and trough 202 may be configured in the collapsed state. FIGS. 2E-H illustrate a top view, bottom view, side view, and front view, respectively of FIG. 2A.

Figure 3B:
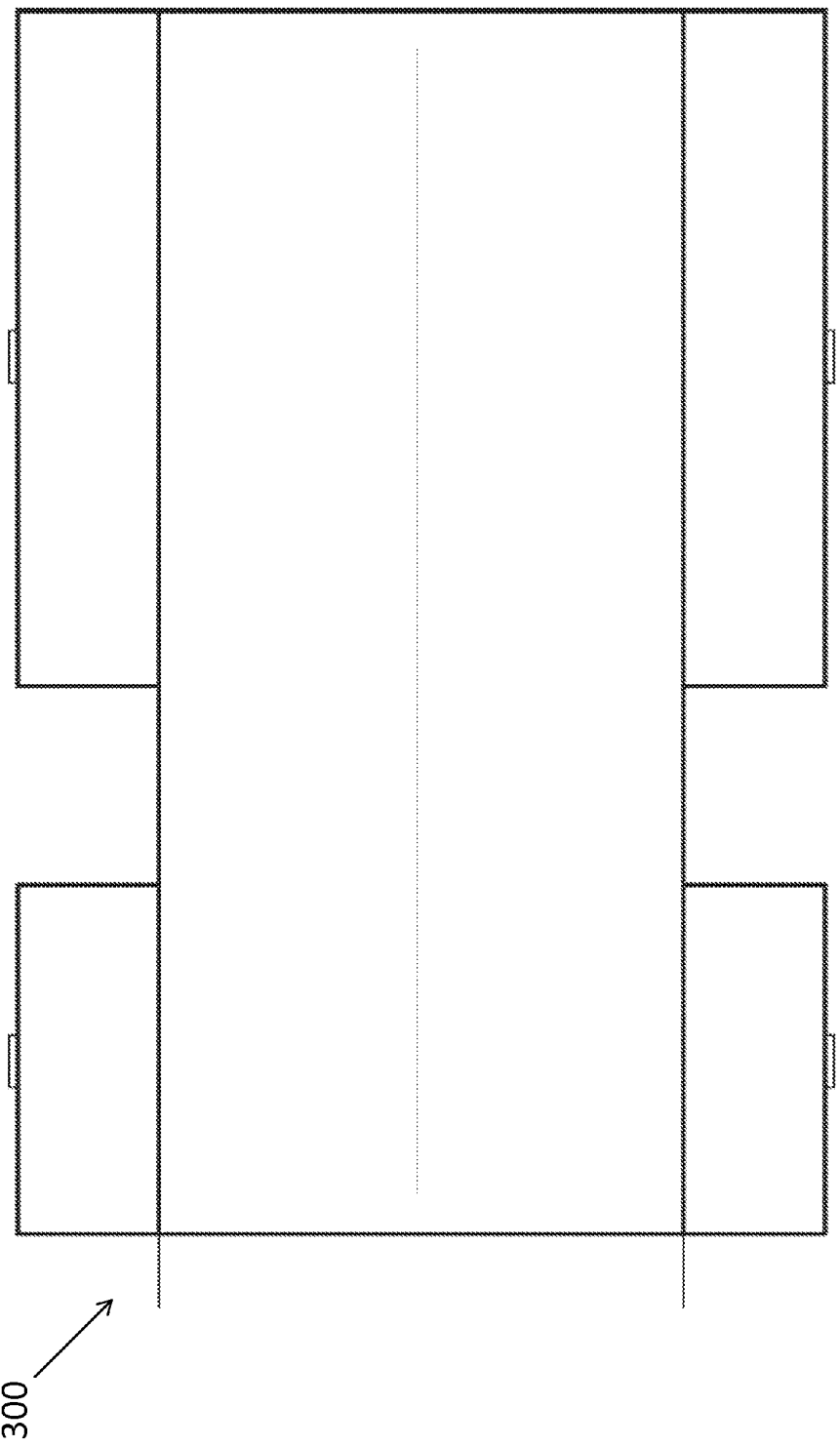
FIG. 3B illustrates a top view of FIG. 3A.
Figure 3C:
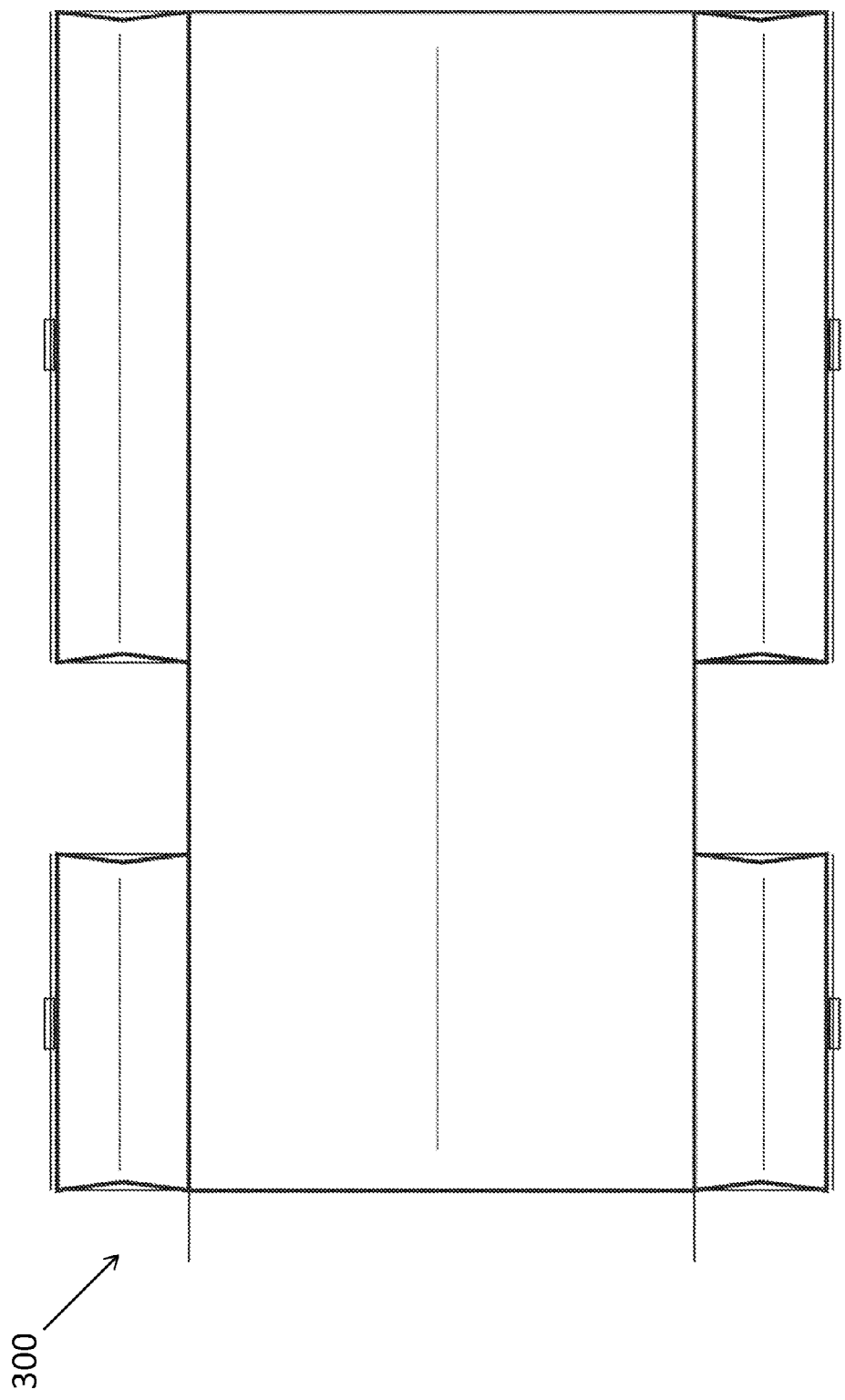
FIG. 3C illustrates a bottom view of FIG. 3A.
Figure 3D:
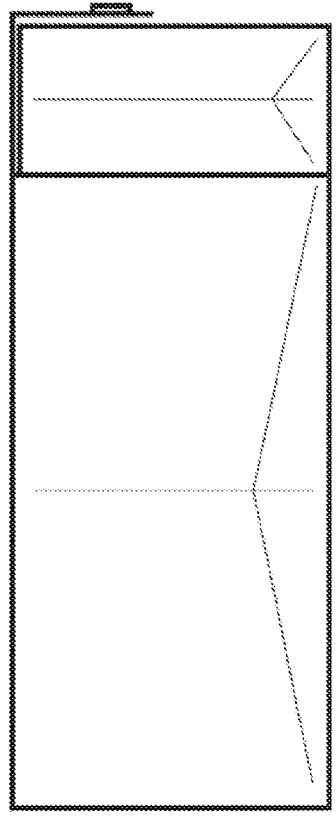
FIG. 3D illustrates a side view of FIG. 3A.
Figure 3E:
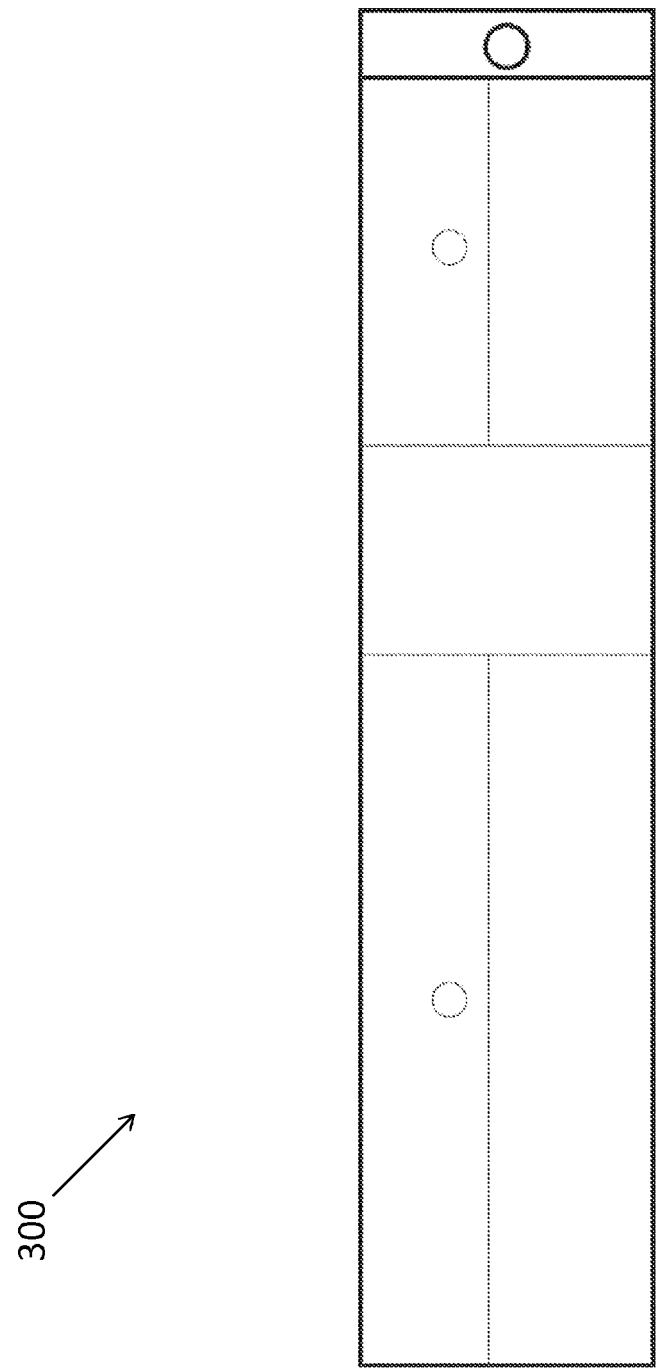
FIG. 3E illustrates a back view of FIG. 3A.

FIGS. 3A-E, 4, 5, 6, and 7 illustrate different embodiments of the pet bowl, with different numbers and different configurations of the side pockets. FIG. 3A illustrates a front perspective view of a pet bowl 300 having a trough and side pockets on multiple sides. FIGS. 3B-E illustrate a top view, bottom view, side view, and back view, respectively of FIG. 3A. Multiple side pockets may be on different sides of the trough, such as on opposing sides (as illustrated in FIG. 3A) or on adjacent sides. Further, the side pockets may be the same size, or may be different sizes (as illustrated in FIG. 3A).

Figure 4:
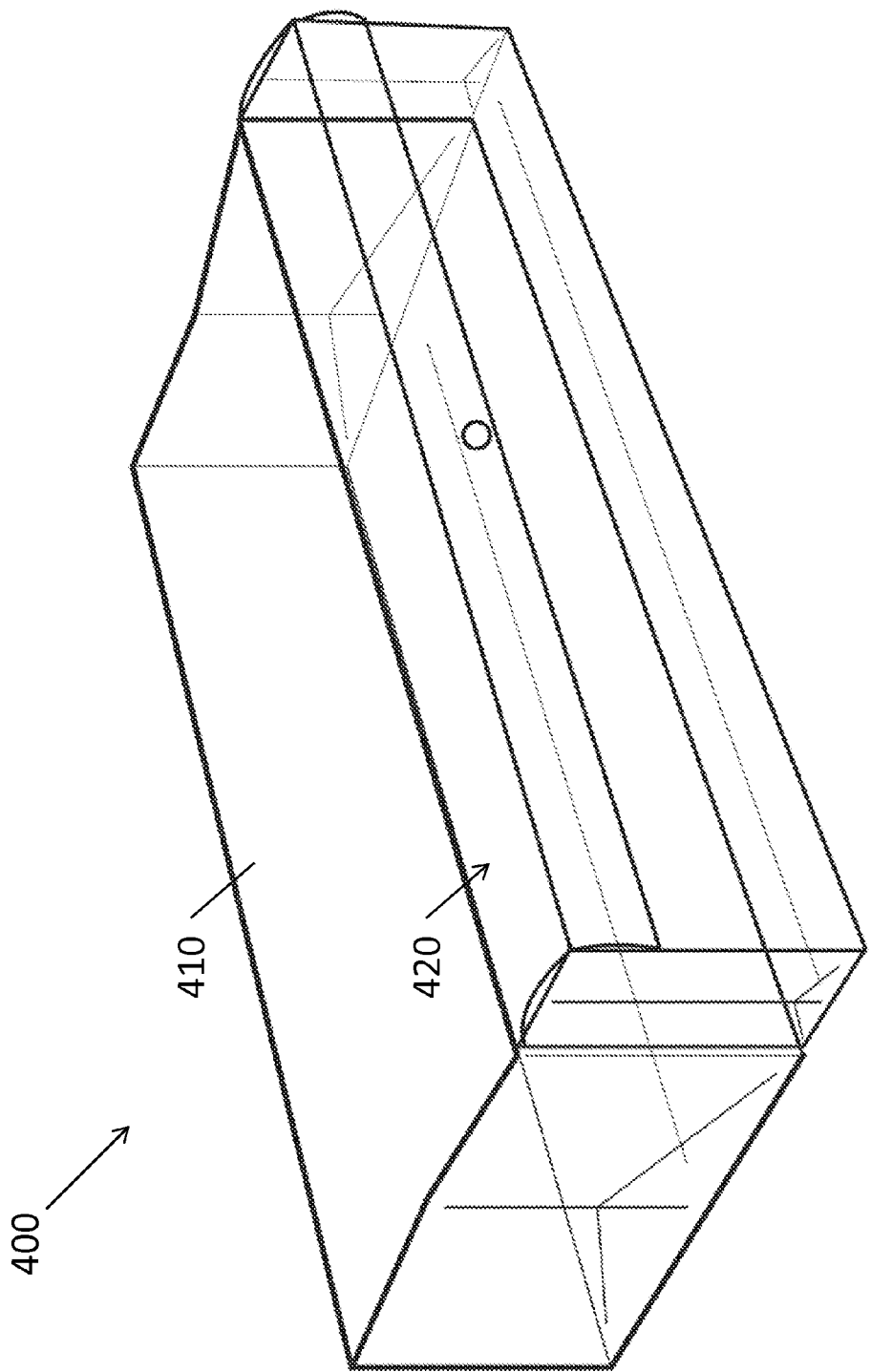
FIG. 4 illustrates a front perspective view of a trough and a single side pocket on a single side for a pet bowl in an expanded state.

FIG. 4 illustrates a front perspective view of a pet bowl 400 having a trough and a single side pocket on a single side. As discussed above, a single side pocket 420 (such as illustrated in FIG. 4) or multiple side pockets may be included in the pet bowl. The single side pocket may span an entire length of a side of the trough 410 (such as illustrated in FIG. 4) or may span less than the entire length of a side of the trough 410.

Figure 5:
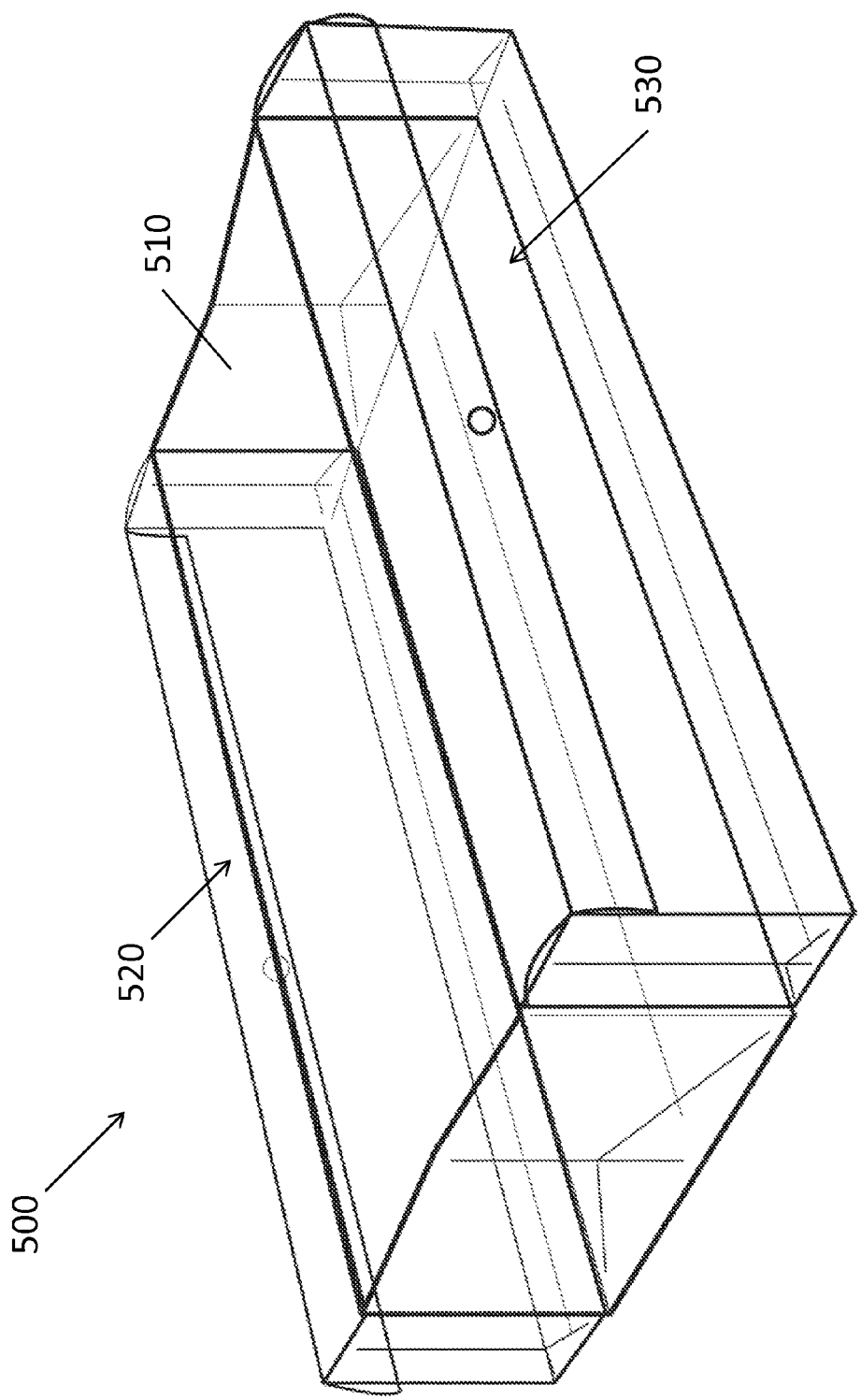
FIG. 5 illustrates a front perspective view of a trough and a single side pocket on multiple sides for a pet bowl in an expanded state.

FIG. 5 illustrates a front perspective view of a pet bowl 500 having a trough and a single side pocket on multiple sides. Similar to FIG. 4, the side pockets 520, 530 span an entire length of trough 510.

Figure 6:
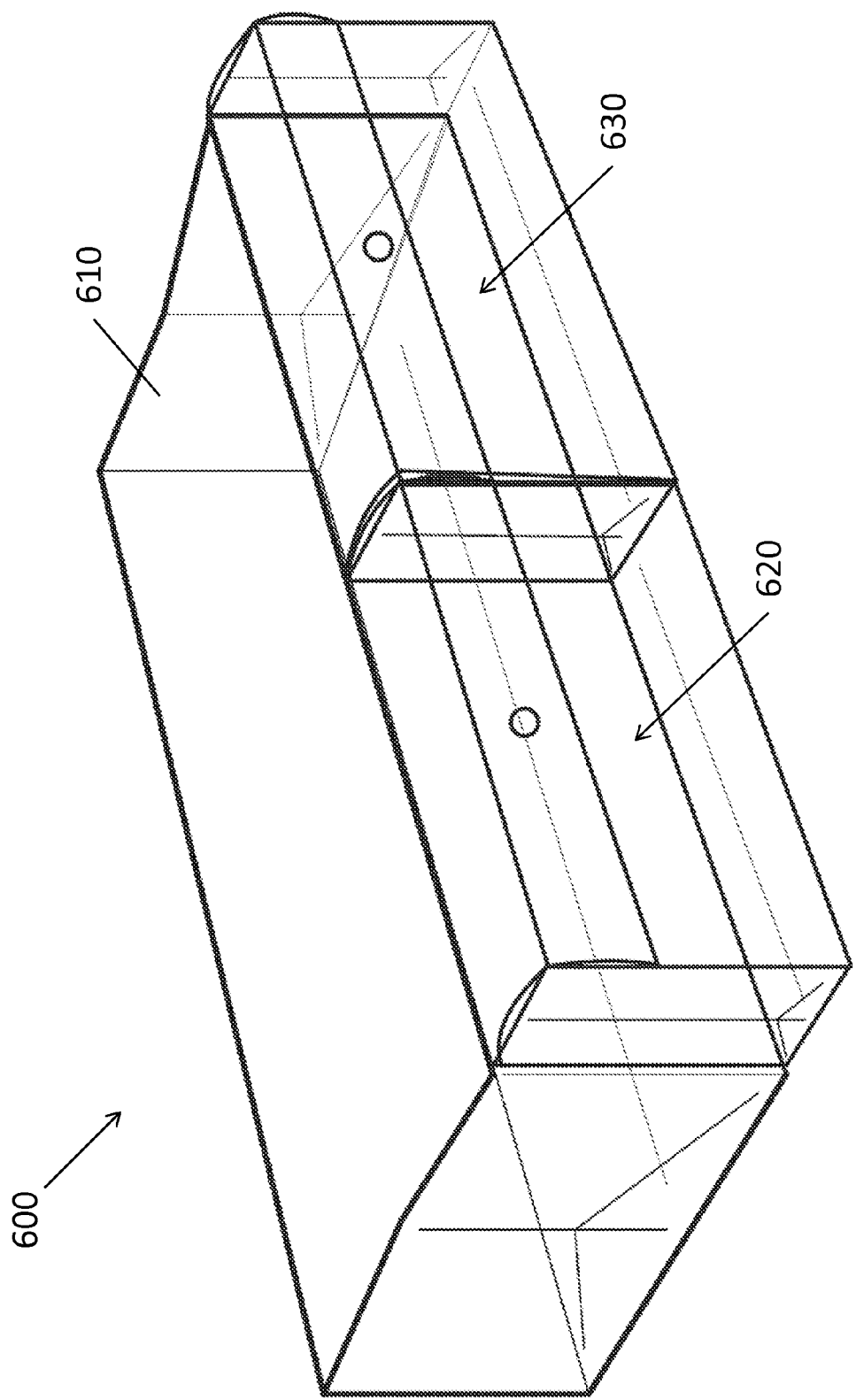
FIG. 6 illustrates a front perspective view of a trough and multiple side pockets on a single side for a pet bowl in an expanded state.
Figure 7:
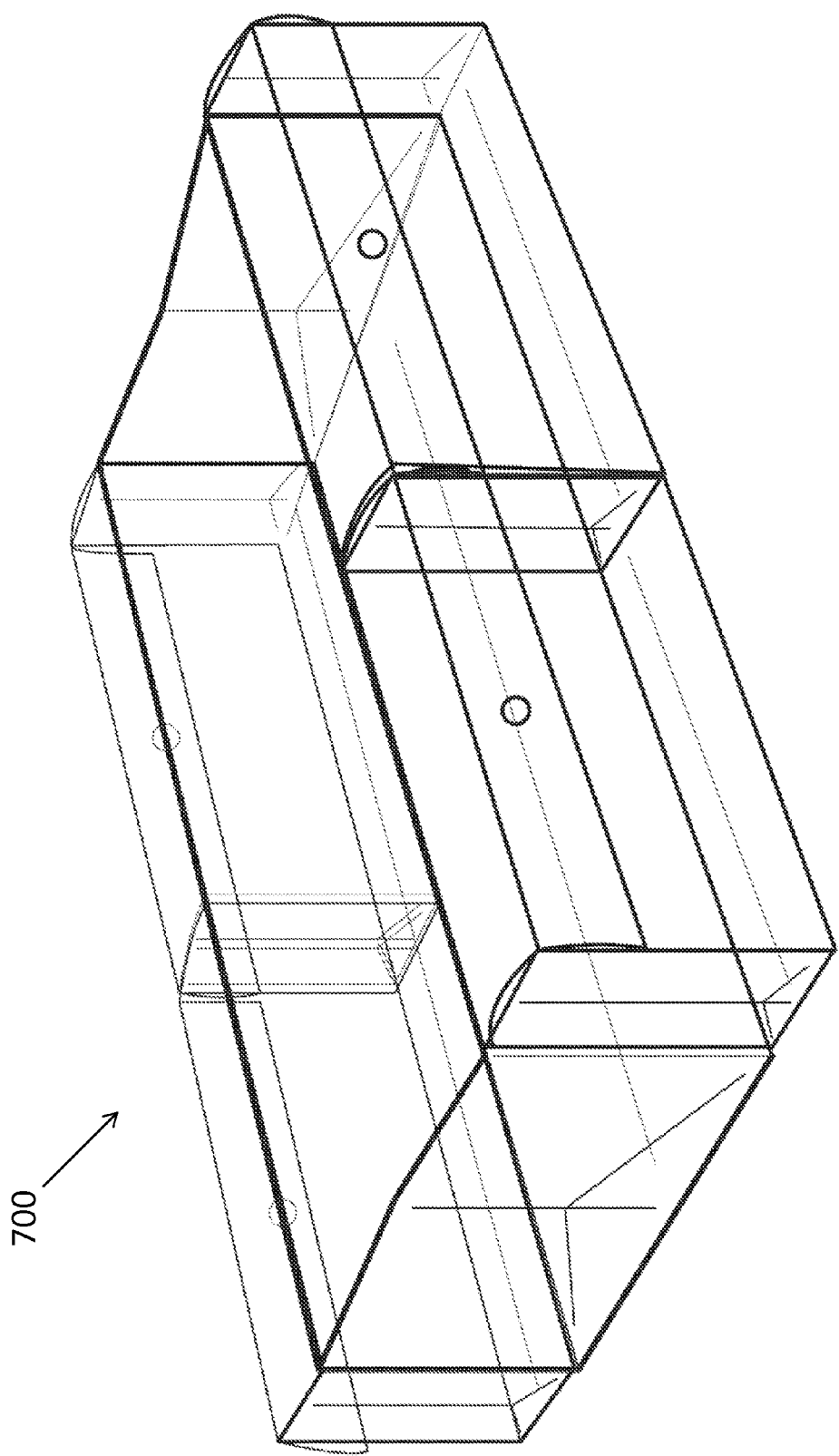
FIG. 7 illustrates a front perspective view of a trough and multiple side pockets on multiple sides for a pet bowl in an expanded state.

FIG. 6 illustrates a front perspective view of a pet bowl 600 having a trough and multiple side pockets on a single side. Multiple side pockets 620, 630 may span an entire length of a side of the trough 610 (such as illustrated in FIG. 6) or may span less than the entire length of a side of the trough (such as illustrated in FIG. 2A). FIG. 7 illustrates a front perspective view of a pet bowl 700 having a trough and multiple side pockets on multiple sides.

FIG. 8 illustrates a front perspective view of a trough and multiple side pockets on a single side for a pet bowl 800 in an expanded state.

FIG. 9 illustrates a front perspective view of a trough and multiple side pockets on multiple sides for a pet bowl 900 in an expanded state.

Figure 10A:
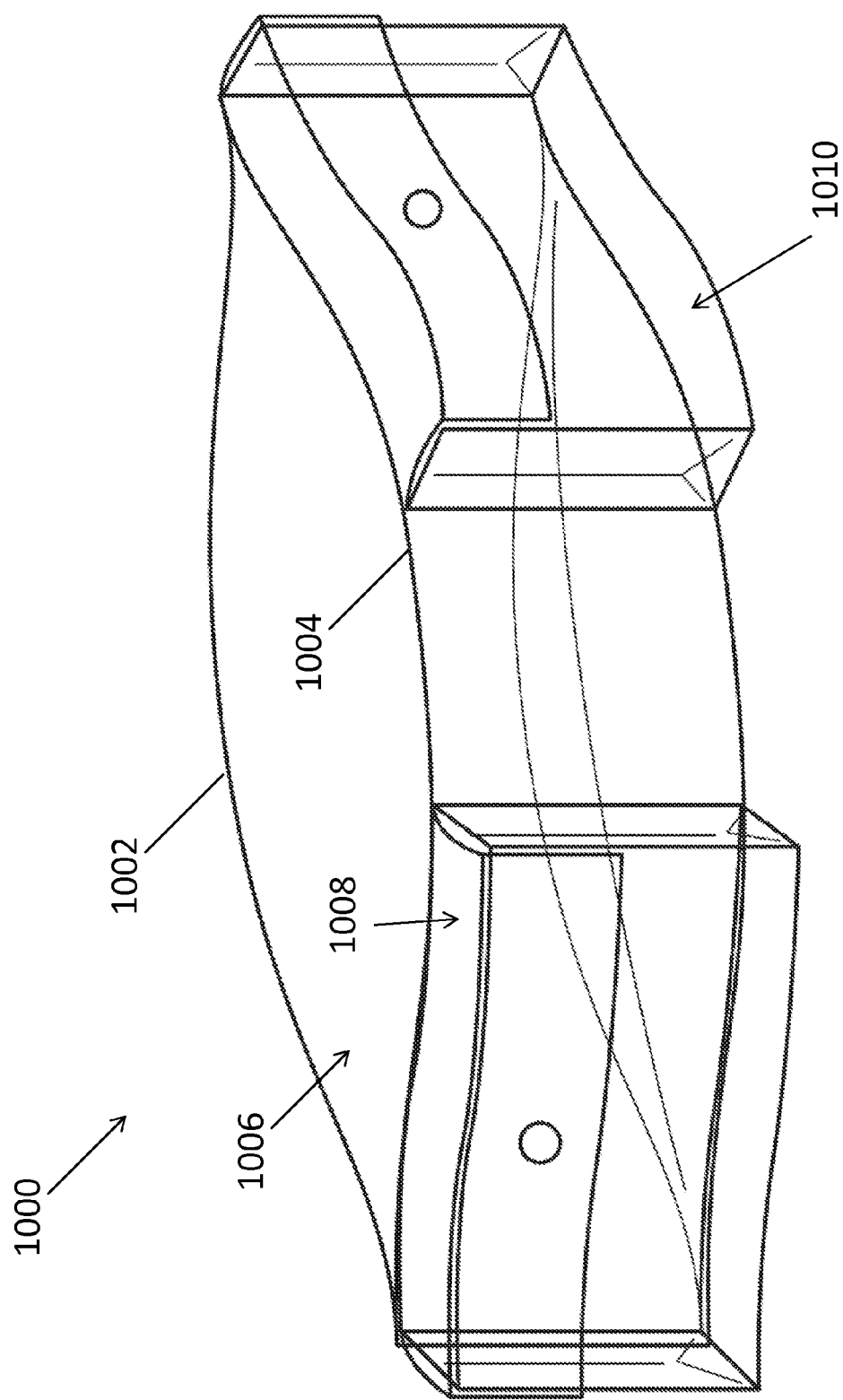
FIG. 10A illustrates a front perspective view of a trough and multiple side pockets on a single side for a pet bowl in an expanded state, where the sides of the pet bowl are curved.
Figure 10B:
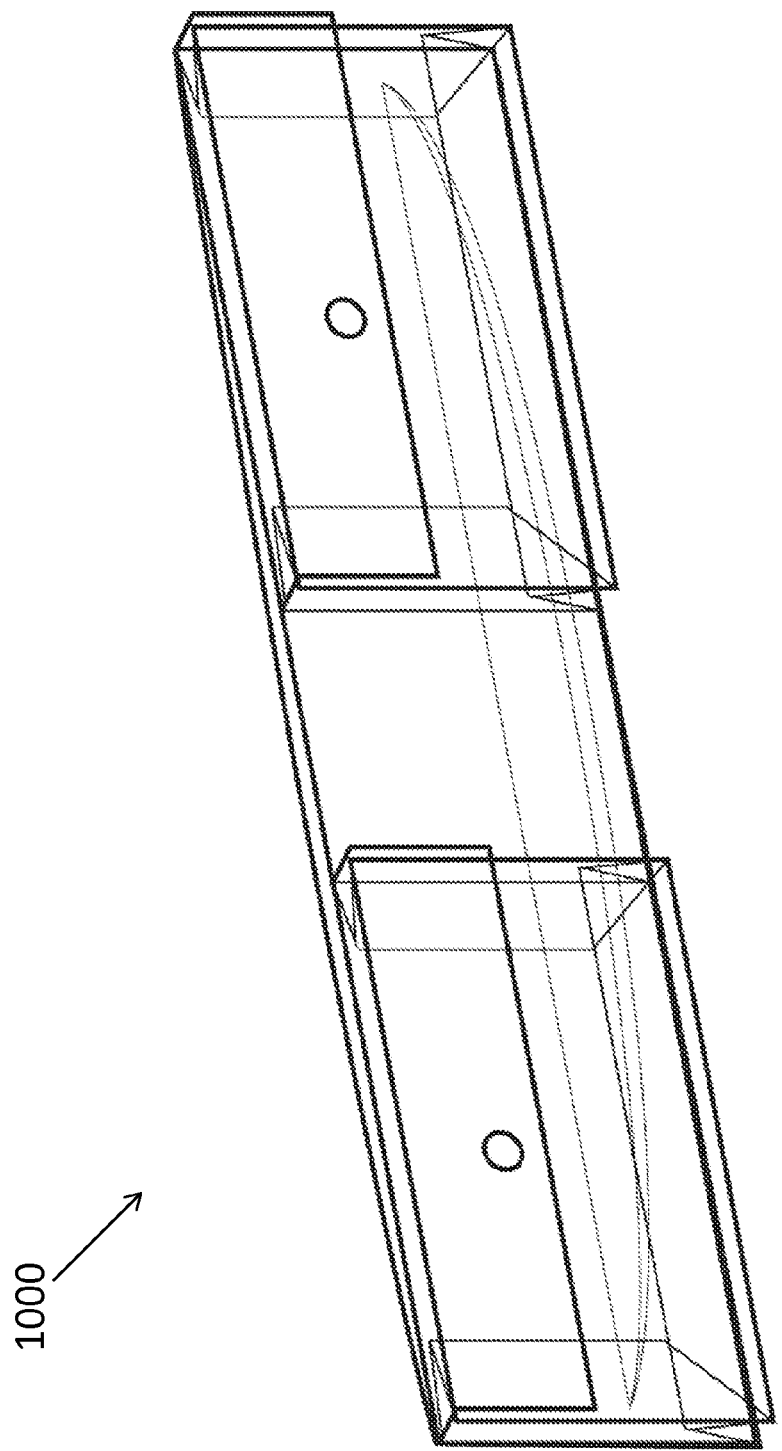
FIG. 10B illustrates the front perspective view of the pet bowl illustrated in FIG. 10A in a collapsed state.
Figure 10C:
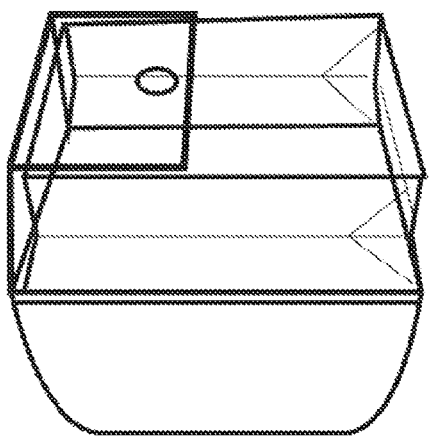
FIG. 10C illustrates the side view of the pet bowl illustrated in FIG. 10A in an expanded state.
Figure 10D:
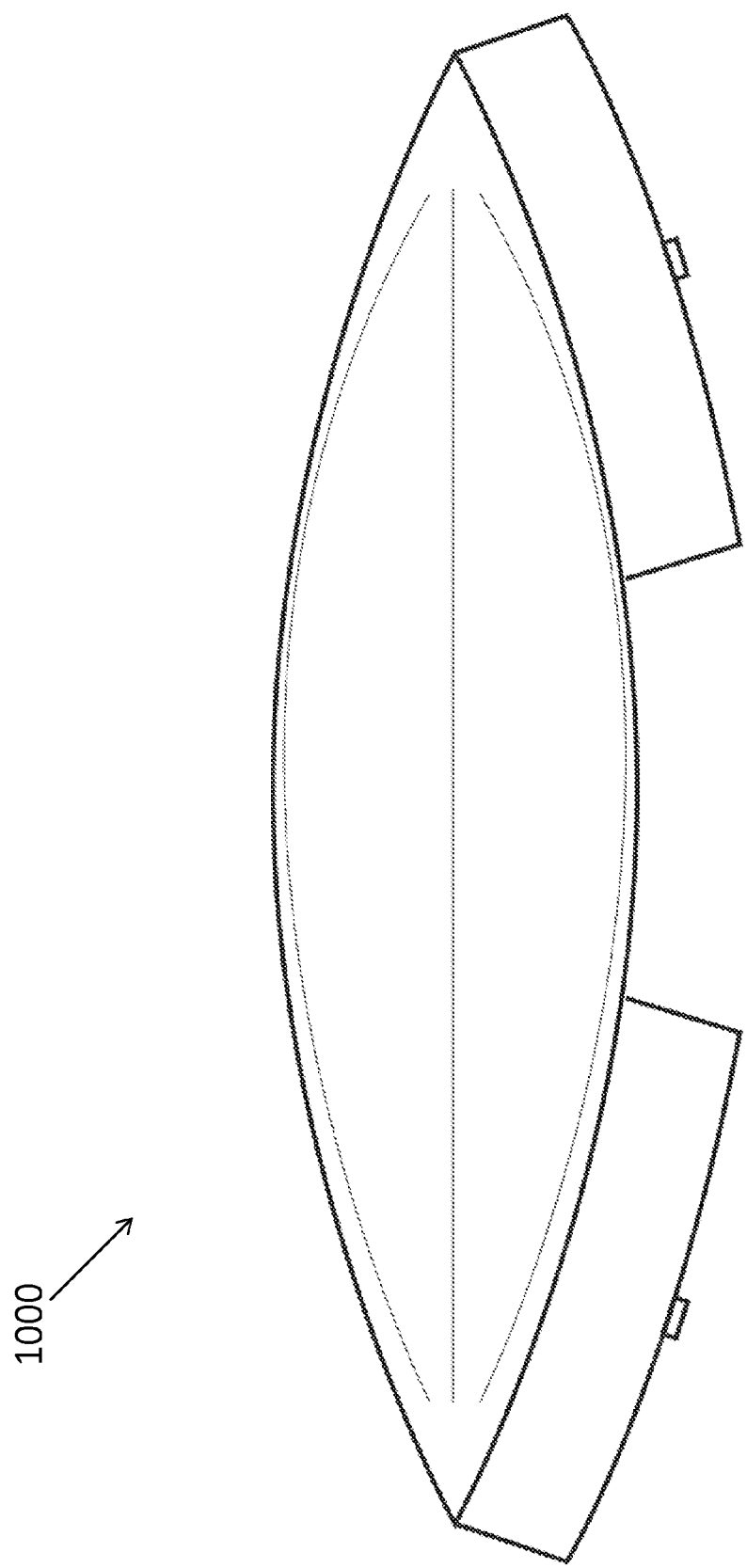
FIG. 10D illustrates the top view of the pet bowl illustrated in FIG. 10A in an expanded state.
Figure 10E:
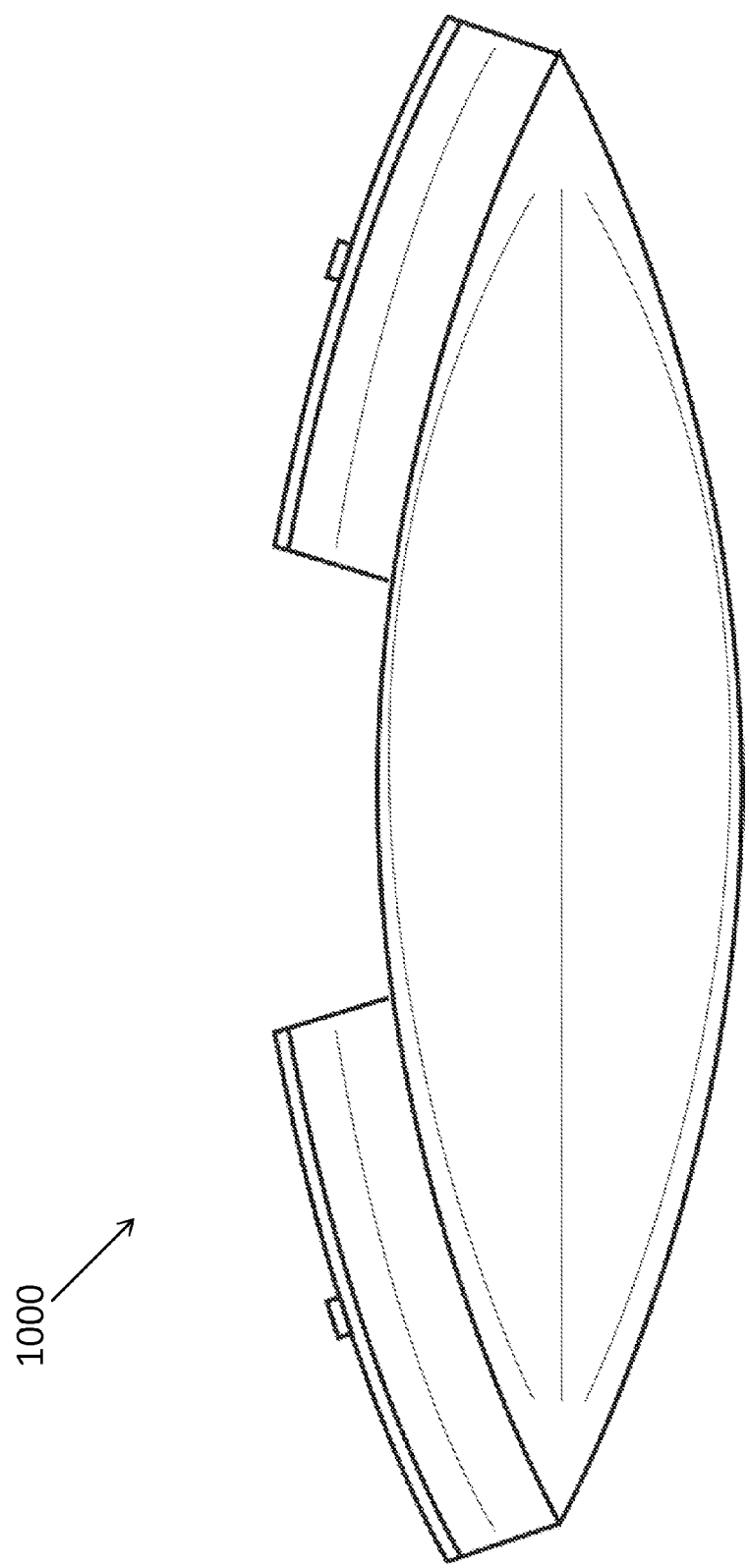
FIG. 10E illustrates the bottom view of the pet bowl illustrated in FIG. 10A in an expanded state.

FIG. 10A illustrates a front perspective view of a trough and multiple side pockets on a single side for a pet bowl 1000 in an expanded state, where the sides of the pet bowl are curved. FIG. 10B illustrates the front perspective view of the pet bowl illustrated in FIG. 10A in a collapsed state. FIG. 10C-E illustrates the side view, the top view, and the bottom view, respectively, of the pet bowl illustrated in FIG. 10A in an expanded state.

The sides 1002, 1004 of the pet bowl 1000 may be curved in shape. The curvature may comprise a radially outwardly extending center portion with opposing tapered corners. As another example, the sides 1002, 1004 may be Gaussian in shape. Other curved sides are contemplated. The trough 1006 likewise may have a curved shape, following the sides 1002, 1004. Similarly, pockets 1008, 1010 may have curved sides that generally follow the shape of side 1004.

Similar to trough 110 and trough 202, trough 1006 is formed with multiple sides and a bottom and may be configured to receive liquid and/or food. In this regard, the multiple sides and the bottom may be seal in order to be leak-proof or reduce leaks in trough 1006.

Though not shown in FIG. 10A, one or both of pockets 1008, 1010 may have a slit, similar or identical to slit 246 illustrated in FIG. 2A. Further, one or more sides of pet bowl 1000 may have flaps, similar or identical to flaps 218, 222 illustrated in FIG. 2A. The flaps may include a hole, similar to hole 220 and hole 224 illustrated in FIG. 2A, and may comprise a grommet or a reinforced eyelet through which a fastener may be passed.

As shown in FIG. 10A, the pockets 1008, 1010 are generally of the same size. Alternatively, the pockets 1008, 1010 may be of different sizes. For example, one pocket may be a smaller size than the second pocket. Further, pockets 1008, 1010 are spaced apart from one another. Alternatively, the pockets 1008, 1010 may touch one another, such as illustrated in FIGS. 6-7.

Figure 11:
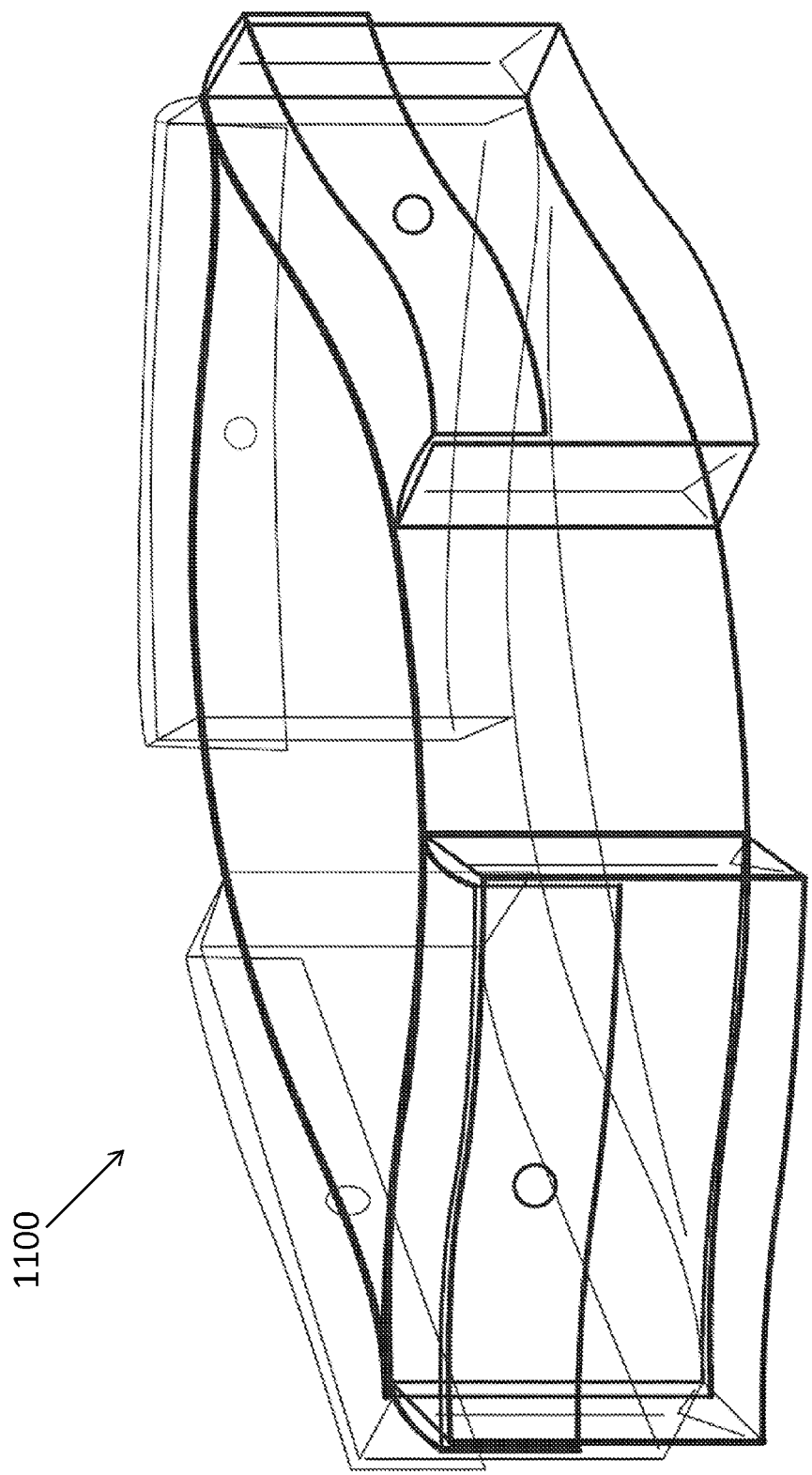
FIG. 11 illustrates a front perspective view of a trough and multiple side pockets on multiple sides for a pet bowl in an expanded state, where the sides of the pet bowl are curved.

FIG. 11 illustrates a front perspective view of a trough and multiple side pockets on multiple sides for a pet bowl 1100 in an expanded state, where the sides of the pet bowl are curved.

It is intended that the foregoing detailed description be understood as an illustration of selected forms that the invention can take and not as a definition of the invention. It is only the following claims, including all equivalents, which are intended to define the scope of this invention. Also, some of the following claims may state that a component is operative to perform a certain function or configured for a certain task. It should be noted that these are not restrictive limitations. It should also be noted that the acts recited in the claims can be performed in any order and not necessarily in the order in which they are recited.

What is claimed is:

1. A pet bowl comprising:
 a collapsible multi-sided trough, the trough being sealed and configured to receive liquid or pet food; and
 one or more side pockets along one or more sides of the trough,
 wherein at least one of the side pockets includes one or more sidewalls, a bottom, an opening, and a top;
 wherein the at least one of the side pockets includes a closing mechanism configured to connect the top to at least one sidewall in order to close the opening; and
 wherein the at least one sidewall includes a slit configured for accessing an interior of the at least one side pocket without disconnecting the top from the at least one sidewall to expose the opening.

2. The pet bowl of claim 1, wherein, when the collapsible multi-sided trough is extended, the multi-sided trough comprises a four-sided trough; and
 wherein the one or more side pockets are collapsible.

3. The pet bowl of claim 2, wherein the one or more side pockets are along only a single side of the trough.

4. The pet bowl of claim 3, wherein the one or more side pockets comprise multiple side pockets along the single side of the trough.

5. The pet bowl of claim 3, wherein the one or more side pockets consist of a single side pocket spanning an entire length of the single side of the trough.

6. The pet bowl of claim 2, wherein the one or more side pockets are along multiple sides of the trough.

7. The pet bowl of claim 6, wherein the one or more side pockets comprise multiple side pockets along the multiple sides of the trough.

8. The pet bowl of claim 6, wherein, a side pocket spans an entire length of each of the multiple sides of the trough.

9. The pet bowl of claim 1, wherein the one or more side pockets are collapsible.

10. The pet bowl of claim 1, wherein the closing mechanism comprises a button.

11. The pet bowl of claim 1, wherein the closing mechanism comprises a zipper.

12. The pet bowl of claim 1, wherein the collapsible multi-sided trough consists of a bottom and two sides.

13. The pet bowl of claim 12, wherein when the collapsible multi-sided trough is extended, the two sides are symmetrical and curved.

14. The pet bowl of claim 13, wherein the collapsible multi-sided trough comprises two sides, each of the two sides having a radially outwardly extending center portion with opposing tapered corners.

15. The pet bowl of claim 13, wherein the collapsible multi-sided trough consists of two sides, each of the two sides having a radially outwardly extending center portion with opposing tapered corners.

16. A pet bowl comprising:
 a collapsible multi-sided trough, the trough being sealed and configured to receive liquid or pet food; and
 one or more side pockets along one or more sides of the trough,
 wherein the trough includes a at least one flap alongside one or more edges of the trough.

17. The pet bowl of claim 16, wherein the flap is formed by heat sealing two sides of the trough.

18. The pet bowl of claim 16, wherein the flap includes a grommet.

19. The pet bowl of claim 16, wherein the at least one flap includes a plurality of flaps, each of the plurality of flaps along a different edge of the trough.

20. The pet bowl of claim 16, wherein the plurality of flaps each include a grommet.

\* \* \* \* \*